(12) United States Patent  (10) Patent No.: US 8,437,577 B2
Ferguson  (45) Date of Patent: May 7, 2013

(54) METHODS AND SYSTEMS FOR IMAGE REGISTRATION

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 954 days.

(21) Appl. No.: 12/398,703

(22) Filed: Mar. 5, 2009

(65) Prior Publication Data
US 2010/0226592 A1 Sep. 9, 2010

(51) Int. Cl.
G06K 9/32 (2006.01)

(52) U.S. Cl.
USPC ............................ 382/294; 382/298; 382/300

(58) Field of Classification Search .................. 382/298, 382/294, 300
See application file for complete search history.

(56) References Cited

U.S. PATENT DOCUMENTS

| | | | |
|---|---|---|---|
| 5,850,466 A * | 12/1998 | Schott | 382/141 |
| 6,690,840 B1 * | 2/2004 | Janko et al. | 382/294 |
| 6,738,532 B1 * | 5/2004 | Oldroyd | 382/294 |
| 7,920,758 B2 * | 4/2011 | Ferguson | 382/281 |
| 8,005,301 B2 * | 8/2011 | Plant | 382/209 |
| 8,184,163 B2 * | 5/2012 | Ferguson | 348/180 |
| 2008/0152257 A1 * | 6/2008 | Ferguson | 382/281 |

FOREIGN PATENT DOCUMENTS

| | | |
|---|---|---|
| WO | 98/19272 | 5/1998 |
| WO | WO 9819272 A1 * | 5/1998 |

OTHER PUBLICATIONS

EP Search Report for European Patent Application No. 10155694.2 dated Oct. 22, 2012, 7 pages.

* cited by examiner

Primary Examiner — Jayesh A Patel
(74) Attorney, Agent, or Firm — Kristine E. Matthews; Michael A. Nelson

(57) ABSTRACT

Aspects of the present invention are related to methods and systems for image processing, in particular, to methods and systems for computationally efficient and robust image alignment. Initially, larger image features may be used to approximate an alignment measurement. Results of the initial measurement may be used to narrow the search range used in conjunction with higher-resolution images in subsequent alignment measurements. The narrowed search range may insure that if the alignment measurement using the fine-detail images fails, then the measured results may have the accuracy as indicated by the prior, reduced-image-based measurement.

9 Claims, 4 Drawing Sheets

METHODS AND SYSTEMS FOR IMAGE REGISTRATION

FIELD OF THE INVENTION

Figure 1:
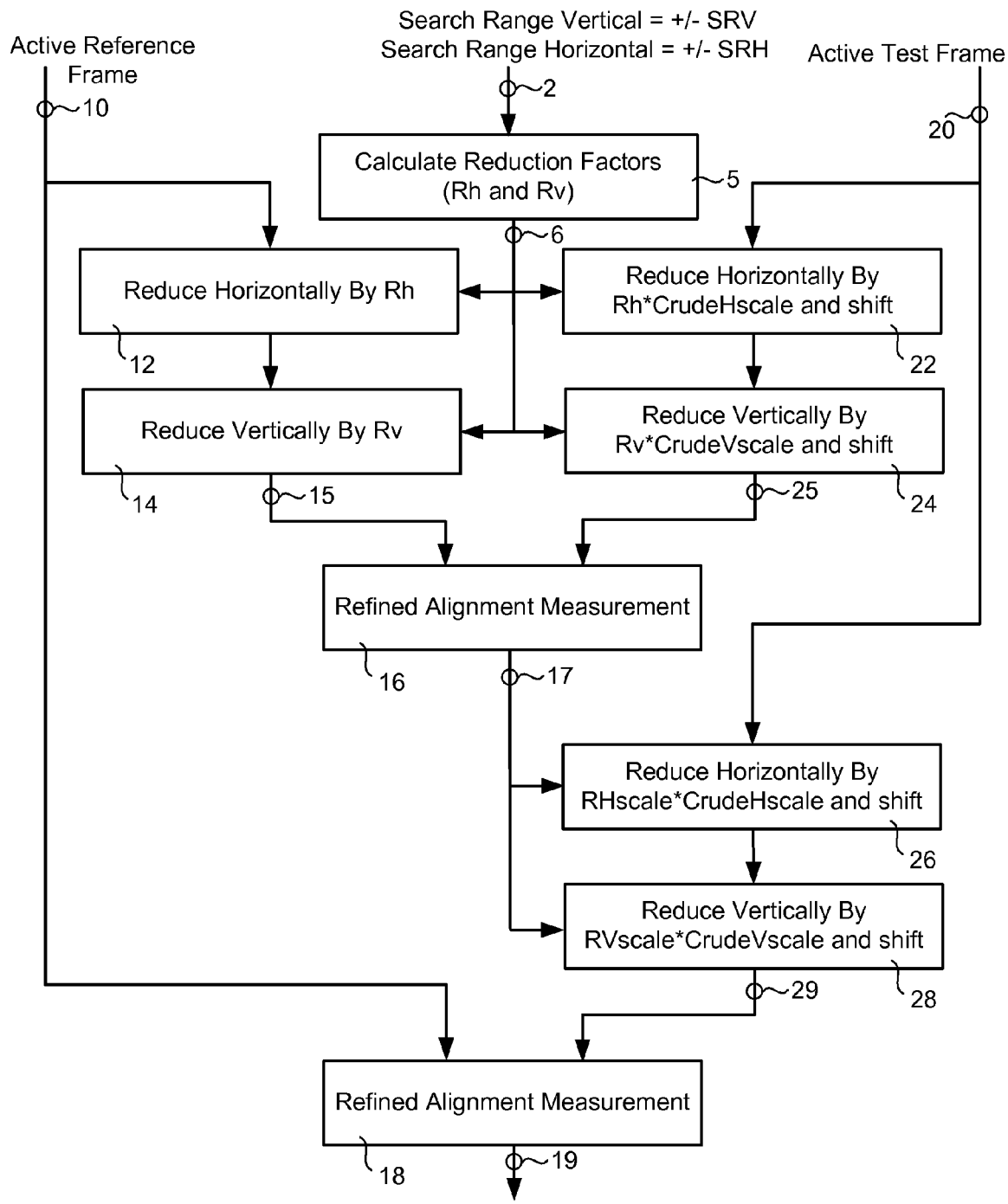

Embodiments of the present invention relate, in general, to methods and systems for image processing, and more particularly, to methods and systems for image alignment.

BACKGROUND

With the proliferation of video formats and devices, changes in image size, registration and cropping may occur more frequently. Video reformatting for repurposing may also be more common than in the past. For example, sending a 720 sample per line 601 SD (Standard Definition) video signal as a 704 ATSC (Advanced Television Systems Committee) digital broadcast signal would require reformatting. As another example, conversion of a 720 SD video signal to a 1920 HD (High Definition) video signal, which may be necessitated by an SD and HD simulcast, may also require reformatting. In addition to reformatting that may arise due to changing broadcast options, conversion of video format for consumption on mobile devices and other handheld devices, for example, conversion of HD to QCIF (Quarter Common Image Format) may require reformatting. This reformatting may require a change in image size, a spatial shift, also referred to as spatial registration, a loss of image content near the image borders, also referred to as cropping, or other formatting changes. Such reformatting may require that an image fit into a new aspect ratio, for example 16:9 versus 4:3, denoting a width-to-height ratio. Reformatting may require truncation, or cropping, on the sides of an image, or adding blank border segments on the sides, also referred to as the side panels, of an image, or similarly the same on the top and bottom of the image, for example, in the case of letterbox images. Reformatting may present problems for equipment manufacturers, broadcasters, editors and other video professionals. Processing equipment may be set in incorrect modes or may malfunction, or standards may vary, for example, as in the 720 pixel to 704 pixel example above.

A measurement instrument capable of executing a method of measuring spatial distortion, scale, offset or shift, and cropping of video output may be useful. In addition, picture measurements may benefit from spatial alignment between a video test sequence image and a video reference sequence image for full-reference measurements.

In the past, alignment has been achieved, at least in part, using a proprietary stripe place over the original video image. This is intrusive and requires that the test and reference video both have the stripe, which requires that the stripe be added prior to video compression or other processing required for transmission or storage. In some applications, it is not practical or desirable to add the stripe once the need for measurement arises, and this has been a limitation for automated picture quality measurement applications.

An automated method of measuring spatial distortion for automated video measurement (VM) applications such as consumer electronics video output verification may be useful. A method for automated spatial alignment for use in connection with automatic picture quality (PQ) measurements may also be useful. It may be desirable that the method be robust in the presence of digital compression artifacts, random noise, quantization error, non-linear distortion, linear distortion, interference and other process which may impair the quality of a video signal. It may also be desirable for this method to operate without prior knowledge of the video content, including any stripe added to the video signal, aspect ratio, DUT (Device Under Test) pixel clock, or other indications of the likely horizontal or vertical scaling, offset or cropping.

Additionally, it may be desirable that the method be both accurate and computationally efficient. With improvements in codec (coder/decoder) technology, primarily in the deployment and improvements in H.264 codecs, 1920 pixel by 1080 pixel HD video increasingly tends to have major objectively measured error that causes very poor correlation in details, while appearing to a viewer, under normal viewing conditions, nearly the same as the original reference video. In particular, improved accuracy for measuring spatial distortion for HD video codecs, for example, the H.264 codec, and other applications where pixel-level test video may be impaired may be beneficial. The pixel-level test video may be impaired to the point of having low localized correlation while appearing, under normal viewing conditions, to an average viewer to be of good quality. A computationally efficient and accurate method that additionally maintains the useful features described above may be advantageous.

SUMMARY

Accordingly, embodiments of the present invention comprise methods and systems for computationally efficient and accurate registration of image pairs.

In some embodiments of the present invention, a first reduction factor associated with a first direction may be determined, and a second reduction factor associated with a second direction may be determined. A reference image may be scaled according to the first reduction factor and the second reduction factor. In some embodiments, a test image may be scaled according to the first reduction factor and the second reduction factor. In some of these embodiments, the test image may be a crudely aligned version of an associated test image. In alternative embodiments, a test image may be scaled according to the first reduction factor and the second reduction factor in addition to being crudely aligned according to a crude alignment measurement made between the reference image and the test image. A first alignment measurement may be determined using the scaled test image and the scaled reference image. After the test image is adjusted according to the first alignment measurement, the reference image and the adjusted test image may be used to measure a second alignment measurement. The first alignment measurement may be of accuracy related to the first reduction factor and the second reduction factor, and the search range for the second alignment measurement may be related to the first reduction factor and the second reduction factor.

In alternative embodiments of the present invention, successive refinement of alignment measurements may be obtained using successively higher-resolution images and smaller search ranges. In an exemplary embodiment, a first reduction factor associated with a first direction may be determined, and a second reduction factor associated with a second direction may be determined. A reference image may be scaled according to the first reduction factor and the second reduction factor. In some embodiments, a test image may be scaled according to the first reduction factor and the second reduction factor. In some of these embodiments, the test image may be a crudely aligned version of an associated test image. In alternative embodiments, a test image may be scaled according to the first reduction factor and the second reduction factor in addition to being crudely aligned according to a crude alignment measurement made between the reference image and the test image. A first alignment measurement may be determined using the scaled test image and the scaled reference image. After the test image is adjusted according to the first alignment measurement, the reference image and the adjusted test image may be further scaled according to a third reduction factor associated with the first direction and a fourth reduction factor associated with the second direction. A second alignment measurement may be determined using the reduced reference image and the reduced, adjusted test image. The adjusted test image may be further adjusted in accordance with the second alignment measurement and this twice-adjusted test image and the reference image may be used to determine a completed alignment measurement.

Alternative embodiments of the present invention may comprise separate alignment processing for vertical alignment and horizontal alignment. In an exemplary embodiment of this type, vertical alignment processing may be omitted in a first pass, such that only horizontal alignment may be processed to completion. Then a second pass, in which no horizontal alignment processing is done, may be made such that only vertical alignment may be processed to completion.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 2:
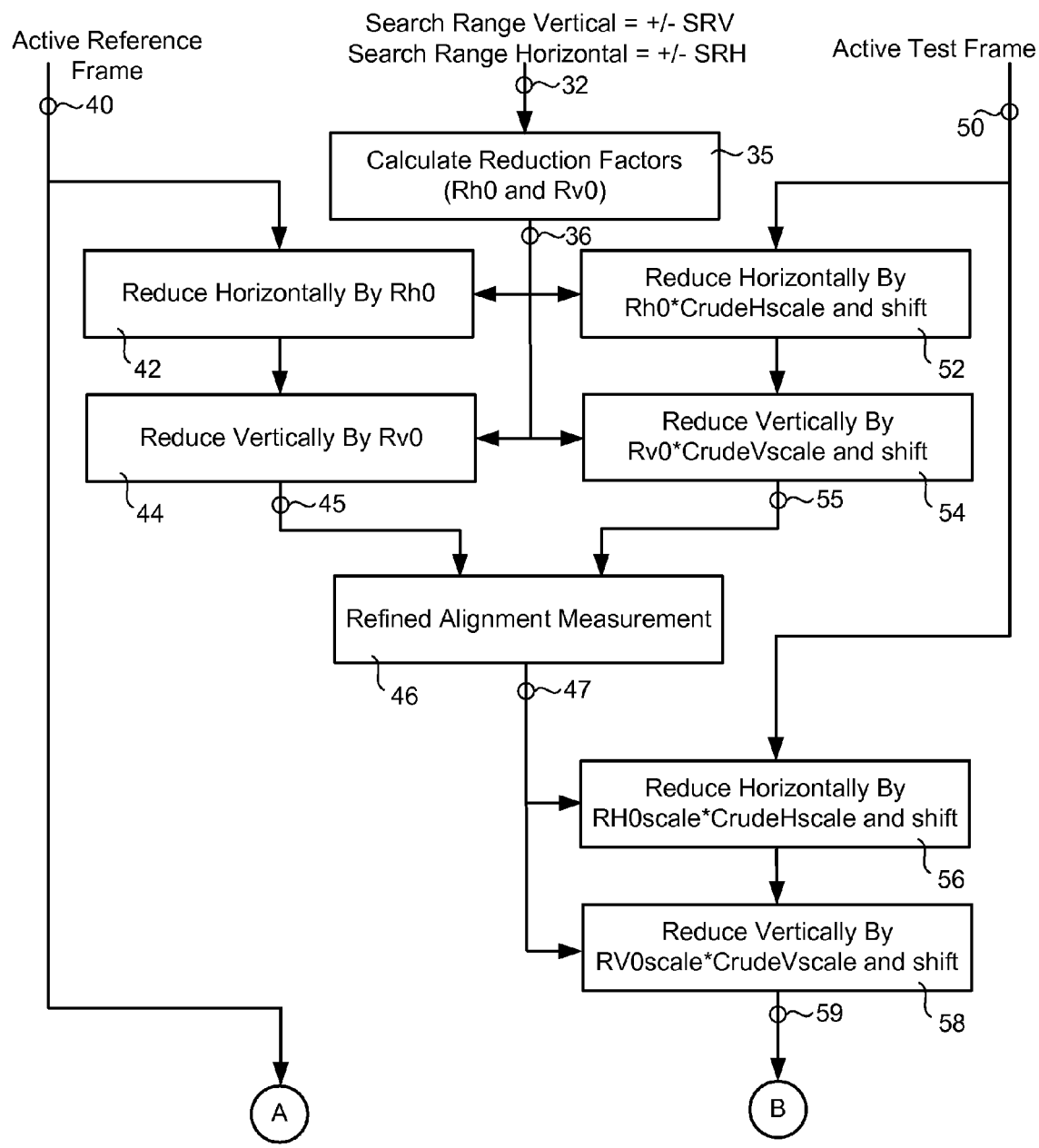
Figure 2:
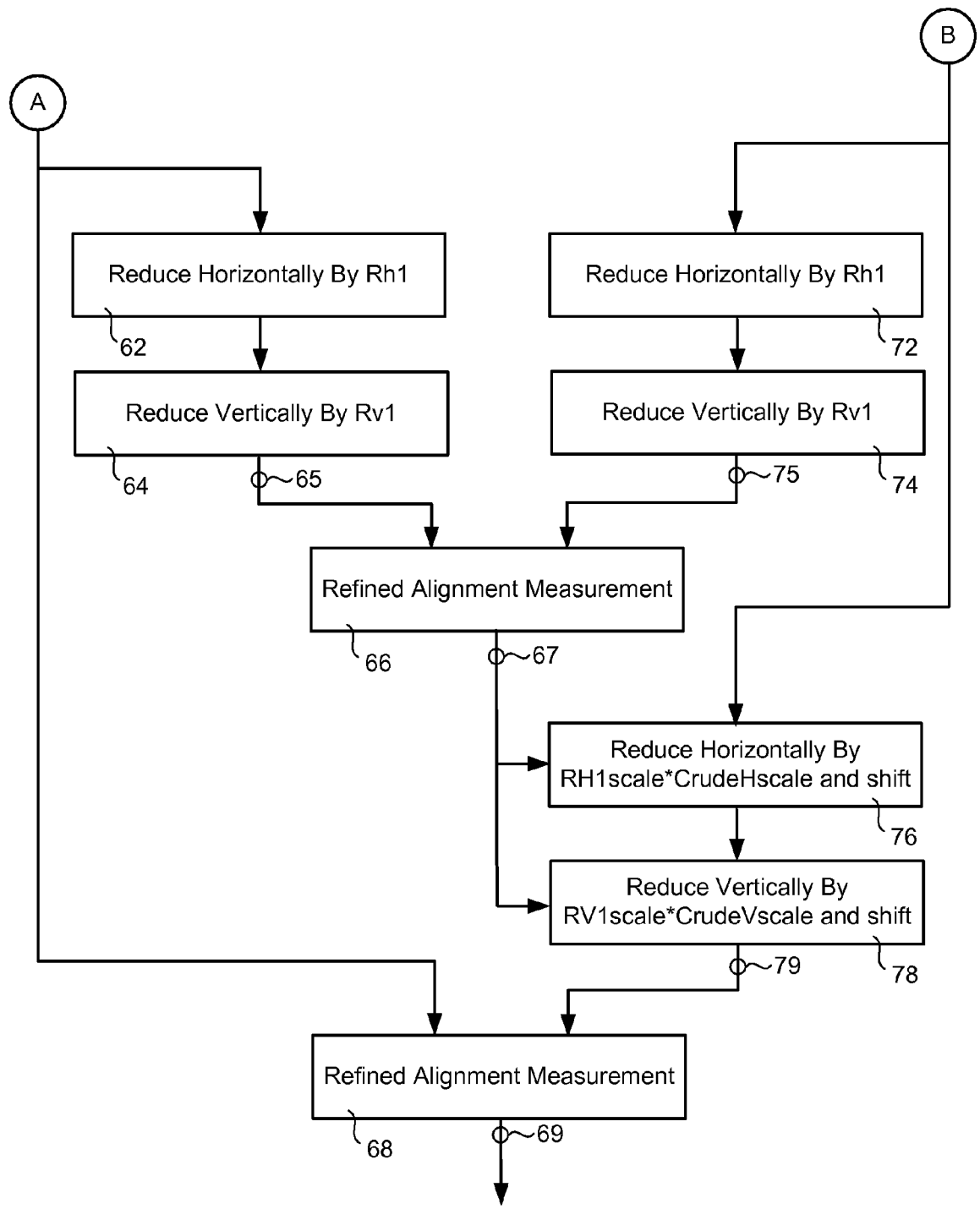
Figure 3:
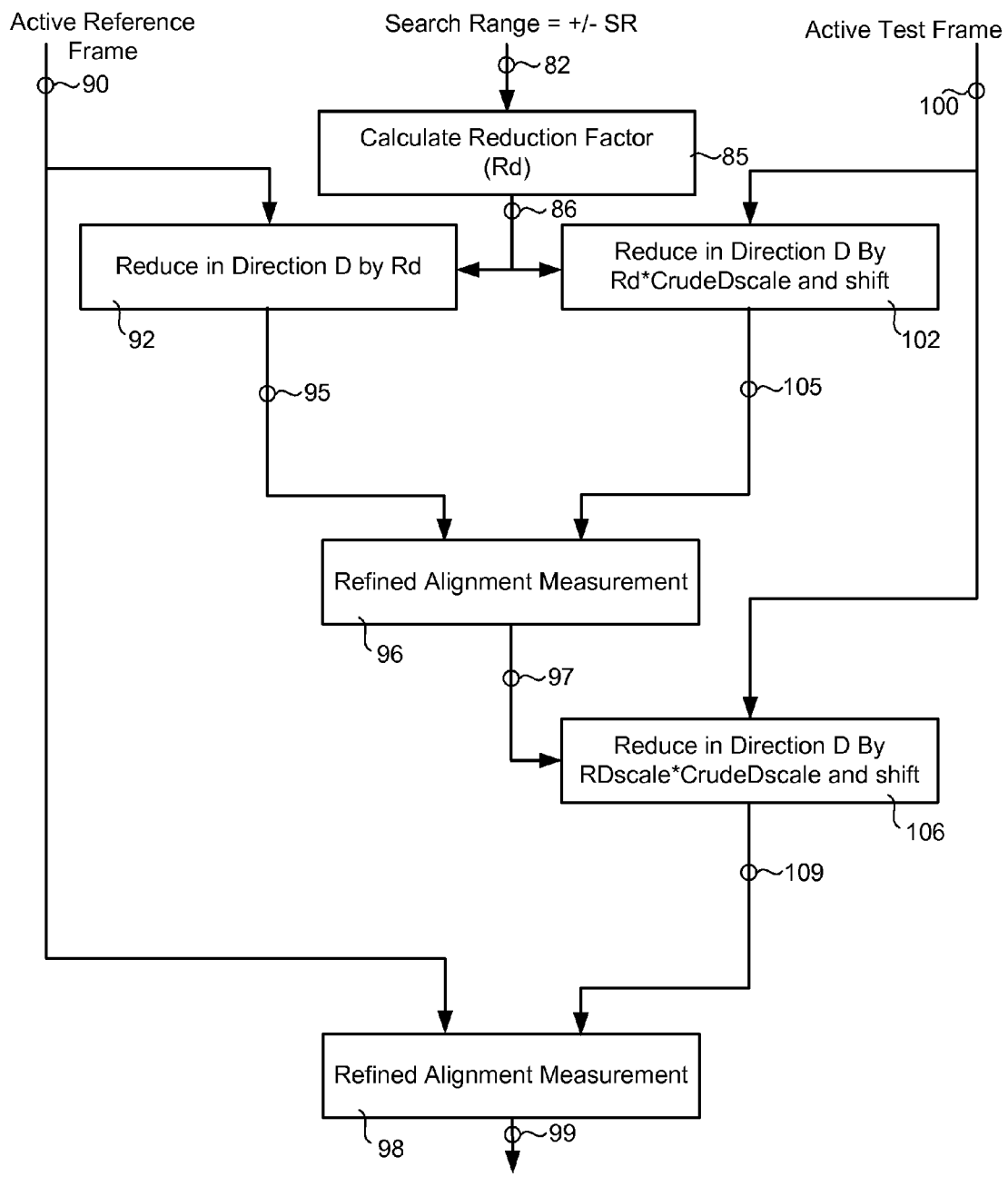

FIG. 1 is a chart showing exemplary embodiments of the present invention comprising an initial determination of an alignment measurement using a reduced resolution reference image and a reduced resolution test image followed by a subsequent refinement of the initial alignment measurement, wherein the subsequent refinement uses the original reference image and a test image adjusted according to the initial alignment measurement;

FIG. 2 is a chart showing exemplary embodiments of the present invention comprising multiple refinement stages for refining an alignment measurement; and FIG. 3 is a chart showing exemplary embodiments of the present invention comprising an initial determination of an alignment measurement in one direction using a reduced resolution reference image and a reduced resolution test image followed by a subsequent refinement of the initial alignment measurement, wherein the subsequent refinement uses the original reference image and a test image adjusted according to the initial alignment measurement.

DETAILED DESCRIPTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of embodiments of the invention.

Embodiments of the present invention may be implemented within a test and measurement instrument. For example, embodiments of the present invention may be implemented in a video test instrument, such as a picture quality analyzer. Picture quality analyzers such as the TEKTRONIX® PQA500 may incorporate embodiments of the present invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may be used to process signals originating from video equipment. These video signals might be produced by playback equipment, such as DVD players, set-top boxes or production equipment used by broadcasters, or other content providers, prior to transmission of content to end-users.

Some embodiments of the present invention may be described in relation to an exemplary scenario wherein an acquired video test sequence image may be spatially aligned to a video reference sequence image. Spatial alignment measurements may be performed according to methods and systems developed by Kevin M. Ferguson, the present inventor, and described in U.S. patent application Ser. No. 11/944,050, hereinafter the '050 application, entitled "Measurement Apparatus and Method of Measurement of Video Spatial Scale, Offset and Cropping," filed on Nov. 21, 2007, and which is hereby incorporated herein by reference in its entirety. The '050 application claims the benefit of U.S. Provisional Patent Application Ser. No. 60/867,087, filed on Nov. 22, 2006, and which is hereby incorporated herein by reference in its entirety.

Some embodiments of the invention described in the '050 application may use a linear Hough transform of an image of continuously local test and reference cross-correlation to measure spatial distortion parameters, for example, horizontal scale, vertical scale, offset, cropping, and other spatial distortion parameters, relative to a reference image, from an acquired test image subject to linear and non-linear distortions. Exemplary linear and non-linear distortions may include digital compression and analog transmission artifacts and other distortions.

Embodiments of the present invention may be described herein in relation to spatial registration and alignment measurements, but may also be applied to temporal registration and other applications wherein matching, mapping, correlation, identification, searching and other similarity finding methods may be required over parameters of shift (for example, delay, anticipation, translation and other shift parameters) and scale (for example, sample rate, gain, multiplier and other scale parameters). Additionally, embodiments of the present invention may be used in applications wherein rotation, transforms and other manipulations may have occurred between a reference and a test signal or data.

Embodiments of the present invention may be described herein in relation to alignment of a video test sequence image with a video reference sequence image, but it should be appreciated that the embodiments of the present invention may be applied to the alignment of images that are not associated with video sequences.

Some embodiments of the present invention may be described in relation to FIG. 1 and FIG. 2. In these embodiments, a video test sequence image, also considered a test frame, may be aligned spatially to a video reference sequence image, also considered a reference frame. Initially, larger image features may be used to approximate an alignment measurement. Results of the initial measurement may be used to narrow the search range used in conjunction with higher-resolution images in subsequent alignment measurements. The narrowed search range may insure that if the alignment measurement using the fine-detail images fails, then the measured results may have the accuracy as indicated by the prior, reduced-image-based measurement.

Some embodiments of the present invention described in relation to FIG. 1 may comprise calculation 5 of a reduction factor 6 associated with a alignment measurement search range 2. In some embodiments, the reduction factor 6 may comprise a first-direction reduction factor in a first direction, for example, the horizontal direction, and a second-direction reduction factor in a second direction, for example, the vertical direction. In alternative embodiments, the reduction factor 6 may be the same in each of two directions, for example, the vertical and the horizontal directions. In some embodiments of the present invention, the reduction factor in a first direction may be determined according to:

$$FirstDirectionReductionFactor = \left\lfloor \left(\frac{3}{2} FirstDirectionSearchRange\right)^{\frac{2}{5}} \right\rfloor,$$

where FirstDirectionReductionFactor may denote the reduction factor in the first direction, FirstDirectionSearchRange may denote the search range in the first direction and $\lfloor \square \rfloor$ may denote the greatest integer, or floor, function. The reduction factor in a second direction may be determined according to:

$$SecondDirectionReductionFactor = \left\lfloor \left(\frac{3}{2} SecondDirectionSearchRange\right)^{\frac{2}{5}} \right\rfloor,$$

where SecondDirectionReductionFactor may denote the reduction factor in the second direction and SecondDirectionSearchRange may denote the search range in the second direction.

In some embodiments of the present invention wherein the first direction may be associated with the horizontal image direction and the second direction may be associated with the vertical image direction, the horizontal reduction factor, which may be denoted Rh, and the vertical reduction factor, which may be denoted Rv, may be determined according to:

$$Rh = \left\lfloor \left(\frac{3}{2} SRH\right)^{\frac{2}{5}} \right\rfloor \text{ and } Rv = \left\lfloor \left(\frac{3}{2} SRV\right)^{\frac{2}{5}} \right\rfloor,$$

respectively, where SRH and SRV, denote the respective horizontal and vertical search ranges.

In some embodiments of the present invention, determination of the reduction factor may comprise optimizing the total processing time with respect to the reduction factor. In alternative embodiments of the present invention (not shown), the reduction factor may be set to a pre-determined value. In still alternative embodiments of the present invention (not shown), the reduction factor may be calculated according to other image parameters or characteristics.

In some embodiments of the present invention shown in FIG. 1, an active reference frame 10 may be reduced horizontally 12 and reduced vertically 14 according to the determined 5 horizontal reduction factor 6 and the determined 5 vertical reduction factor 6, respectively. An active test frame may be reduced horizontally and reduced vertically according to the determined horizontal reduction factor and the determined vertical reduction factor, respectively. In some embodiments of the present invention shown in FIG. 1, the active test frame 20 may be reduced horizontally 22 by the horizontal reduction factor 6 and a crude horizontal scale determined according to a crude alignment obtained according to the '050 application or other alignment method known in the art. The active test frame 20 may be reduced vertically 24 by the vertical reduction factor 6 and a crude vertical scale determined according to the crude alignment. The reduced test image may be shifted according to a crude offset associated with the crude alignment. In alternative embodiments (not shown), the test image may be the resultant image formed according to a crude alignment, and the test image may be reduced according the horizontal and vertical reduction factors.

Image reduction, also considered down-sampling, may be performed, in some embodiments, according to the method of the '050 application. In alternative embodiments, other down-sampling methods may be used for image reduction.

A refined alignment measurement may be performed 16 using the reduced reference image 15 and the reduced test image 25. In some embodiments of the present invention, the refined alignment measurement may be performed 16 according to the '050 application. In alternative embodiments of the present invention, the refined alignment measurement may be performed 16 according to other alignment methods. A search range may be associated with the refined alignment measurement. In some embodiments of the present invention, the search range in an image dimension may be 30 percent of the image size in the associated dimension. Due to the reduced size of the test and reference images, the refined alignment measurement may be performed with increased computational speed relative to a measurement made on the larger-sized images with a search range of the same percentage value.

The resulting alignment measurement result 17 of the lower resolution images may comprise a horizontal scale measurement, which may be denoted RHscale, a vertical scale measurement, which may be denoted RVscale, a horizontal offset measurement, which may be denoted RHoffset, and a vertical offset measurement, which may be denoted, RVoffset. This lower-resolution-images measurement may correspond to measurements in higher resolution images of lower accuracy which may be based on the reduction factor in relation to the higher resolution images. In particular, the alignment may be correct within an accuracy of ±Rh pixels in the horizontal direction and ±Rv pixels in the vertical direction.

The active test image 20 may then be reduced 26, 28 according to the alignment measurement result 17. A refined alignment measurement may be performed 18 using the alignment adjusted test image 29 and the active reference frame 10. A narrowed search range corresponding to the previous reduction factor may be used in the refined alignment measurement 18. Thus, the alignment 18 may be performed on the larger images, but the search range may be reduced, thereby providing increased computation speed. The resulting alignment measurement results 19 may be accurate to pixel accuracy.

Alternative embodiments of the present invention may be understood in relation to FIG. 2. In these embodiments, successive refinement of alignment measurements may be obtained using successively higher-resolution images and smaller search ranges. The exemplary embodiments of the present invention depicted in FIG. 2 comprise two successive reductions in image size. A person having ordinary skill in the art will appreciate the extension of the method to additional levels of nesting. The exemplary embodiments shown in FIG. 2 should be viewed as illustrative of the methods and systems of the present invention and should not be construed as limiting the present invention.

Some embodiments of the present invention described in relation to FIG. 2 may comprise calculation 35 of an initial reduction factor 36 associated with a alignment measurement search range 32. In some embodiments, the initial reduction factor 36 may comprise an initial first-direction reduction factor in a first direction, for example, the horizontal direction, and an initial second-direction reduction factor in a second direction, for example, the vertical direction. In alternative embodiments, the initial reduction factor 36 may be the same in each of two directions, for example, the vertical and the horizontal directions. In some embodiments of the present invention, the initial reduction factor in a first direction may be determined according to:

$$InitialFirstDirectionReductionFactor = \left\lfloor \left(\frac{3}{2} FirstDirectionSearchRange\right)^{\frac{2}{5}} \right\rfloor,$$

where InitialFirstDirectionReductionFactor may denote the initial reduction factor in the first direction, FirstDirectionSearchRange may denote the search range in the first direction and $\lfloor \Box \rfloor$ may denote the greatest integer, or floor, function. The initial reduction factor in a second direction may be determined according to:

$$InitialSecondDirectionReductionFactor = \\ \left\lfloor \left(\frac{3}{2} SecondDirectionSearchRange\right)^{\frac{2}{5}} \right\rfloor,$$

where InitialSecondDirectionReductionFactor may denote the initial reduction factor in the second direction and SecondDirectionSearchRange may denote the search range in the second direction.

In some embodiments of the present invention wherein the first direction may be associated with the horizontal image direction and the second direction may be associated with the vertical image direction, the initial horizontal reduction factor, which may be denoted Rh0, and the initial vertical reduction factor, which may be denoted Rv0, may be determined according to:

$$Rh0 = \left\lfloor \left(\frac{3}{2} SRH\right)^{\frac{2}{5}} \right\rfloor \text{ and } Rv0 = \left\lfloor \left(\frac{3}{2} SRV\right)^{\frac{2}{5}} \right\rfloor,$$

respectively, where SRH and SRV, denote the respective horizontal and vertical search ranges.

In some embodiments of the present invention, determination of the initial reduction factor may comprise optimizing the total processing time with respect to the initial reduction factor. In alternative embodiments of the present invention (not shown), the initial reduction factor may be set to a predetermined value. In still alternative embodiments of the present invention (not shown), the initial reduction factor may be calculated according to other image parameters or characteristics.

In some embodiments of the present invention shown in FIG. 2, an active reference frame 40 may be reduced horizontally 42 and reduced vertically 44 according to the determined 35 initial horizontal reduction factor 36 and the determined 35 initial vertical reduction factor 36, respectively. An active test frame may be reduced horizontally and reduced vertically according to the determined initial horizontal reduction factor and the determined initial vertical reduction factor, respectively. In some embodiments of the present invention shown in FIG. 2, the active test frame 50 may be reduced horizontally 52 by the initial horizontal reduction factor 36 and a crude horizontal scale determined according to a crude alignment obtained according to the '050 application or other alignment method known in the art. The active test frame 50 may be reduced vertically 54 by the vertical reduction factor 36 and a crude vertical scale determined according to the crude alignment. The reduced test image may be shifted according to a crude offset associated with the crude alignment. In alternative embodiments (not shown), the test image may be the resultant image formed according to a crude alignment, and the test image may be reduced according the horizontal and vertical reduction factors.

Image reduction, also considered down-sampling, may be performed, in some embodiments, according to the method of the '050 application. In alternative embodiments, other down-sampling methods may be used for image reduction.

A refined alignment measurement may be performed 46 using the reduced reference image 45 and the reduced test image 55. In some embodiments of the present invention, the refined alignment measurement may be performed 46 according to the '050 application. In alternative embodiments of the present invention, the refined alignment measurement may be performed 46 according to other alignment methods. A search range may be associated with the refined alignment measurement. In some embodiments of the present invention, the search range in an image dimension may be 30 percent of the image size in the associated dimension. Due to the reduced size of the test and reference images, the refined alignment measurement may be performed with increased computational speed relative to a measurement made on the larger-sized images with a search range of the same percentage value.

The resulting alignment measurement result 47 of the lower resolution images may comprise a first-result horizontal scale measurement, which may be denoted RH0scale, a first-result vertical scale measurement, which may be denoted RV0scale, a first-result horizontal offset measurement, which may be denoted RH0offset, and a first-result vertical offset measurement, which may be denoted, RV0offset. This lower-resolution-images alignment measurement may correspond to measurements in higher resolution images of lower accuracy which may be based on the reduction factor in relation to the higher resolution images. In particular, the alignment may be correct within an accuracy of ±Rh0 pixels in the horizontal direction and ±Rv0 pixels in the vertical direction.

The active test frame 50 may adjusted 56, 58 according to the results 47 of the alignment measurement 46. The active reference frame 40 and the adjusted test frame 59 may be reduced horizontally 62, 72 and vertically 64, 74 according to a second horizontal reduction factor, Rh1, and a second vertical reduction factor, Rv1, respectively. The second horizontal reduction factor and the second vertical reduction factor may be related to the initial, determined horizontal reduction factor and the initial, determined vertical reduction factor, respectively. In some embodiments of the present invention, the second reduction factors may be approximately half of the initial reduction factors. The resulting reduced reference 65 and test 75 images may be used to obtain 66 a refined alignment measurement 67 using a horizontal search range of ±Rh0 pixels in the horizontal direction and a vertical search range of ±Rv0 pixels in the vertical direction.

The resulting alignment measurement result 67 of the lower resolution images may comprise a second-result horizontal scale measurement, which may be denoted RH1scale, a second-result vertical scale measurement, which may be denoted RV1scale, a second-result horizontal offset measurement, which may be denoted RH1offset, and a second-result vertical offset measurement, which may be denoted, RV1offset. This lower-resolution-images alignment measurement may correspond to measurements in higher resolution images of lower accuracy which may be based on the reduction factor in relation to the higher resolution images. In particular, the alignment may be correct within an accuracy of ±Rh1 pixels in the horizontal direction and ±Rv1 pixels in the vertical direction.

The previously corrected test image 59 may then be reduced 76, 78 according to the alignment measurement result 77. A refined alignment measurement may be performed 68 using the alignment adjusted test image 79 and the active reference frame 10. A narrowed search range corresponding to the previous reduction factor may be used in the refined alignment measurement 68. Thus, the alignment 68 may be performed on the larger images, but the search range may be reduced, thereby providing increased computation speed. The resulting alignment measurement results 69 may be accurate to pixel accuracy.

Alternative embodiments of the present invention may comprise separate alignment processing for vertical alignment and horizontal alignment. In an exemplary embodiment of this type, vertical alignment processing may be omitted in a first pass, such that only horizontal alignment may be processed to completion. Then a second pass, in which no horizontal alignment processing is done, may be made such that only vertical alignment may be processed to completion. These alternative embodiments may be described in relation to FIG. 3.

Some embodiments of the present invention described in relation to FIG. 3 may comprise calculation 85 of a reduction factor 86, which may be denoted Rd, associated with a alignment measurement search range 82, which may be denoted SR, in a first direction, which may be denoted D. In some embodiments, the reduction factor 86 may be associated with the horizontal or vertical direction. In some embodiments of the present invention, the reduction factor in the first direction may be determined according to:

$$Rd = \left\lfloor \left(\frac{3}{2}SR\right)^{\frac{2}{5}} \right\rfloor,$$

where $\lfloor \Box \rfloor$ may denote the greatest integer, or floor, function.

In some embodiments of the present invention, determination of the reduction factor in the first direction may comprise optimizing the total processing time with respect to the reduction factor in the first direction. In alternative embodiments of the present invention (not shown), the reduction factor in the first direction may be set to a pre-determined value. In still alternative embodiments of the present invention (not shown), the reduction factor in the first direction may be calculated according to other image parameters or characteristics.

In some embodiments of the present invention shown in FIG. 3, an active reference frame 90 may be reduced 92 in the first direction, D, according to the determined 85 direction reduction factor 86. An active test frame may be reduced in the first direction, D, according to the determined direction reduction factor. In some embodiments of the present invention shown in FIG. 3, the active test frame 100 may be reduced 102 in the first direction, D, by the direction reduction factor 86 and a crude direction-based scale determined according to a crude alignment obtained according to the '050 application or other alignment method known in the art. The reduced test image may be shifted according to a crude offset associated with the crude alignment. In alternative embodiments (not shown), the test image may be the resultant image formed according to a crude alignment, and the test image may be reduced according the direction reduction factor.

Image reduction, also considered down-sampling, may be performed, in some embodiments, according to the method of the '050 application. In alternative embodiments, other down-sampling methods may be used for image reduction.

A refined alignment measurement may be performed 96 using the reduced reference image 95 and the reduced test image 105. In some embodiments of the present invention, the refined alignment measurement may be performed 96 according to the '050 application. In alternative embodiments of the present invention, the refined alignment measurement may be performed 96 according to other alignment methods. A search range may be associated with the refined alignment measurement. In some embodiments of the present invention, the search range in the first direction may be 30 percent of the image size in the associated dimension. Due to the reduced size of the test and reference images, the refined alignment measurement may be performed with increased computational speed relative to a measurement made on the larger-sized images with a search range of the same percentage value.

The resulting alignment measurement result 97 of the lower resolution images may comprise a first-direction scale measurement, which may be denoted RDscale, and a first-direction offset measurement, which may be denoted RDoffset. This lower-resolution-images measurement may correspond to measurements in higher resolution images of lower accuracy which may be based on the reduction factor in relation to the higher resolution images. In particular, the alignment may be correct within an accuracy of ±Rd pixels in the first direction.

The active test image 100 may then be reduced 106 in the first direction according to the alignment measurement result 97. A refined alignment measurement may be performed 98 using the alignment adjusted test image 109 and the active reference frame 90. A narrowed search range corresponding to the previous reduction factor may be used in the refined alignment measurement 98. Thus, the alignment 98 may be performed on the larger images, but the search range may be reduced, thereby providing increased computation speed. The resulting alignment measurement results 99 may be accurate to pixel accuracy.

In some embodiments of the present invention, alignment processing according to embodiments described in relation to FIG. 3 may be performed in a first direction to completion. Alignment processing according to embodiments described in relation to FIG. 3 may then be performed in a second direction to completion. In some embodiments, the second pass active test frame may be the same as the active test frame from the first pass. In alternative embodiments, the second pass active test frame may be the first pass active test frame adjusted according to the completed alignment measurement made in the first direction.

Alternative embodiments of the present invention comprising separate direction passes may comprise multiple, nested refinement stages in accordance with FIG. 2 modified to process only one direction.

Alternative embodiments of the present invention may comprise adaptive successive refinement. In these embodiments, speed, accuracy and robustness may be balanced adaptively using the estimated correlation coefficient in each refined alignment measurement to determine if more processing may be required. In some embodiments, the maximum correlation associated with a reduced image level may be examined, and if the maximum correlation value is not sufficiently large, then the next level may be measured without reducing the search range. This may occur iteratively until either the maximum correlation value exceeds a threshold or until the resolution reaches the original image resolution.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for aligning a test image and a reference image, said method comprising:
    a) determining a first reduction factor associated with a first direction;
    b) determining a second reduction factor associated with a second direction;
    c) scaling the reference image according to the first reduction factor and the second reduction factor;
    d) scaling the test image according to the first reduction factor and the second reduction factor;
    e) determining a first alignment measurement between the test image and the reference image using the scaled test image and the scaled reference image;
    f) adjusting the test image according to the first alignment measurement; and
    g) determining a second alignment measurement between the test image and the reference image using the adjusted test image and the reference image;
    wherein:
    a) the first reduction factor is based on a first search range in the first direction; and
    b) the second reduction factor is based on a second search range in the second direction;
    and wherein:
    a) the first reduction factor is calculated according to $$\left\lfloor \left(\frac{3}{2} FirstSearchRange\right)^{\frac{2}{5}} \right\rfloor,$$

where FirstSearchRange denotes the first search range; and
    b) the second reduction factor is calculated according to $$\left\lfloor \left(\frac{3}{2} SecondSearchRange\right)^{\frac{2}{5}} \right\rfloor,$$

where SecondSearchRange denotes the second search range.

2. The method as described in claim 1, wherein:
    a) the first direction is a direction selected from the group consisting of vertical and horizontal; and
    b) the second direction is the other, non-selected direction from the group consisting of vertical and horizontal.

3. The method as described in claim 1 further comprising adjusting the test image according to the second alignment measurement.

4. The method as described in claim 1 further comprising:
    a) for the test image and the reference image, receiving a crude alignment measurement; and
    b) wherein:
        i) the scaling the test image further comprises adjusting the test image according to the crude alignment measurement; and
        ii) the adjusting the test image according to the first alignment measurement further comprises adjusting the test image according to the crude alignment measurement.

5. The method as described in claim 1, wherein the test image comprises a crudely aligned version of an image associated with the test image.

6. A method for aligning a test image and a reference image, said method comprising:
    a) determining a first reduction factor associated with a first direction;
    b) scaling, in the first direction, the reference image according to the first reduction factor;
    c) scaling, in the first direction, the test image according to the first reduction factor;
    d) determining a first-direction first alignment measurement, in the first direction, between the test image and the reference image using the first-direction scaled test image and the first-direction scaled reference image;
    e) adjusting the test image according to the first-direction first alignment measurement; and
    f) determining a first-direction second alignment measurement, in the first direction, between the test image and the reference image using the test image adjusted according to the first-direction first alignment measurement and the reference image;
    further comprising:
    a) determining a second reduction factor associated with a second direction;
    b) scaling, in the second direction, the reference image according to the second reduction factor;
    c) scaling, in the second direction, the test image according to the second reduction factor;
    d) determining a second-direction first alignment measurement, in the second direction, between the test image and the reference image using the second-direction scaled test image and the second-direction scaled reference image;
    e) adjusting the test image according to the second-direction first alignment measurement; and
    f) determining a second-direction second alignment measurement, in the second direction, between the test image and the reference using the test image adjusted according to the second-direction first alignment measurement and the reference image;
    wherein:
    a) the first reduction factor is based on a first search range in the first direction; and
    b) the second reduction factor is based on a second search range in the second direction,
    and wherein:
    a) the first reduction factor is calculated according to $$\left\lfloor \left(\frac{3}{2} FirstSearchRange\right)^{\frac{2}{5}} \right\rfloor,$$

where FirstSearchRange denotes the first search range; and
b) the second reduction factor is calculated according to $$\left\lfloor \left(\frac{3}{2} SecondSearchRange\right)^{\frac{2}{5}} \right\rfloor,$$

where SecondSearchRange denotes the second search range.

7. The method as described in claim 6 further comprising:
   a) for the test image and the reference image, receiving a crude alignment measurement; and
   b) wherein:
      i) the scaling, in the first direction, the test image further comprises adjusting the test image according to the crude alignment measurement; and
      ii) the adjusting the test image according to the first-direction first alignment further comprises adjusting the test image according to the crude alignment measurement.

8. The method as described in claim 6, wherein the test image comprises a crudely aligned version of an image associated with the test image.

9. A method for aligning a test image and a reference image, said method comprising:
   a) determining a first reduction factor associated with a first direction;
   b) determining a second reduction factor associated with a second direction;
   c) scaling the reference image according to the first reduction factor and the second reduction factor, thereby producing a first scaled reference image;
   d) scaling the test image according to the first reduction factor and the second reduction factor, thereby producing a first scaled test image;
   e) determining first alignment measurement between the test image and the reference image using the first scaled reference image and the first scaled test image;
   f) adjusting the test image according to the first alignment measurement;
   g) determining a third reduction factor associated with the first direction;
   h) determining a fourth reduction factor associated with the second direction;
   i) scaling the reference image according to the third reduction factor and the fourth reduction factor, thereby producing a second scaled reference image;
   j) scaling the first-alignment-measurement adjusted test image according to the third reduction factor and the fourth reduction factor, thereby producing a scaled, first-adjusted test image;
   k) determining a second alignment measurement between the test image and the reference image using the second scaled reference image and the scaled, first-adjusted test image;
   l) adjusting the first-alignment-measure adjusted test image according to the second alignment measurement; and
   m) determining a third alignment measurement between the test image and the reference image using the reference image and the second-alignment-measurement adjusted first- alignment-measurement adjusted test image.

\* \* \* \* \*

UNITED STATES PATENT AND TRADEMARK OFFICE
CERTIFICATE OF CORRECTION

PATENT NO. : 8,437,577 B2
APPLICATION NO. : 12/398703
DATED : May 7, 2013
INVENTOR(S) : Kevin M. Ferguson It is certified that error appears in the above-identified patent and that said Letters Patent is hereby corrected as shown below:

In the Claims:

Claim 9, Column 14, line 7, the phrase "determining first alignment" should be replaced with the phrase --determining a first alignment--;
Claim 9, Column 14, line 32, the phrase "first- alignment-measurement" should be replaced with the phrase --first-alignment-measurement--.

Signed and Sealed this
Eighth Day of October, 2013

Teresa Stanek Rea
*Deputy Director of the United States Patent and Trademark Office*